(12) United States Patent
Kurtz et al.

(10) Patent No.: US 6,210,989 B1
(45) Date of Patent: Apr. 3, 2001

(54) ULTRA THIN SURFACE MOUNT WAFER SENSOR STRUCTURES AND METHODS FOR FABRICATING SAME

(75) Inventors: Anthony D. Kurtz, Ridgewood; Alexander Ned; Scott J. Goodman, both of Wayne, all of NJ (US)

(73) Assignee: Kulite Semiconductor Products Inc., Leonia, NJ (US)

( * ) Notice: Subject to any disclaimer, the term of this patent is extended or adjusted under 35 U.S.C. 154(b) by 0 days.

(21) Appl. No.: 09/398,969

(22) Filed: Sep. 17, 1999

Related U.S. Application Data (62) Division of application No. 09/041,228, filed on Mar. 12, 1998, now Pat. No. 5,973,590.

(51) Int. Cl.[7] .................................................. H01L 27/20
(52) U.S. Cl. .............................. 438/51; 438/53; 438/456; 73/721; 338/4
(58) Field of Search .................................. 438/51, 53, 55, 438/15, 64, 118, 455, 456; 338/2, 3, 4, 5; 73/721, 746; 257/419

(56) References Cited

U.S. PATENT DOCUMENTS

| | | | |
|---|---|---|---|
| 3,764,950 | * 10/1973 | Wallia ............................... | 338/2 |
| 3,800,264 | * 3/1974 | Kurtz et al. ........................ | 338/2 |
| 3,868,719 | * 2/1975 | Kurtz et al. ........................ | 357/26 |
| 4,063,209 | * 12/1977 | Kurtz et al. ........................ | 338/4 |
| 4,106,349 | * 8/1978 | Kurtz ................................. | 73/746 |
| 4,412,203 | * 10/1983 | Kurtz et al. ........................ | 338/4 |
| 4,462,018 | * 7/1984 | Yang et al. ......................... | 338/3 |
| 4,513,623 | * 4/1985 | Kurtz et al. ........................ | 73/721 |
| 4,672,354 | * 6/1987 | Kurtz et al. ........................ | 338/4 |
| 4,764,747 | * 8/1988 | Kurtz et al. ........................ | 338/2 |
| 4,777,826 | * 10/1988 | Rud, Jr. et al. .................... | 73/708 |
| 4,814,856 | * 3/1989 | Kurtz et al. ........................ | 357/73 |
| 5,002,901 | * 3/1991 | Kurtz et al. ........................ | 438/51 |
| 5,184,515 | * 2/1993 | Terry et al. ........................ | 73/727 |
| 5,209,118 | * 5/1993 | Jerman .............................. | 73/715 |
| 5,286,671 | * 2/1994 | Kurtz et al. ........................ | 437/64 |
| 5,837,562 | * 11/1998 | Cho .................................... | 438/51 |
| 5,955,771 | * 9/1999 | Kurtz et al. ........................ | 438/456 |

FOREIGN PATENT DOCUMENTS 4-83139 * 3/1992 (JP) .

OTHER PUBLICATIONS

Electronics, vol. 53, No. 21, Roger Allan, Sep. 1980.*
High Technology, pp. 43–50, Roger Allan, Sep. 1984.*

* cited by examiner

Primary Examiner—Olik Chaudhuri
Assistant Examiner—Anh Duy Mai
(74) Attorney, Agent, or Firm—Arthur L. Plevy; Buchanan Ingersoll PC (57) ABSTRACT

There is disclosed a semiconductor sensor device comprising a semiconductor diaphragm member having a top surface coated with an oxide layer; P+ sensor elements fusion bonded to the oxide layer at a relatively central area of the diaphragm; P+ finger elements fusion bonded to the oxide layer extending from the sensors to an outer contact location of the diaphragm for each finger; and an external rim of P+ material fusion bonded to the oxide layer and surrounding the sensors and fingers. A first glass wafer member is electrostatically bonded at a bottom surface to the fingers and rim to hermetically seal the sensors and fingers of the diaphragm member. The first glass wafer includes a depression above the sensors and has a plurality of apertures, where each aperture is associated with a separate finger at the contact location and each aperture being smaller than the associated finger lining up with the contact location wherein each contact location can be accessed via the associated aperture in the first glass wafer member. A second glass wafer member is sealingly coupled to a top surface of the first glass wafer and has a plurality of apertures aligned with the plurality of apertures of the first glass wafer member and containing a group of hermetically sealed pins for coupling to the contact locations.

12 Claims, 9 Drawing Sheets

ULTRA THIN SURFACE MOUNT WAFER SENSOR STRUCTURES AND METHODS FOR FABRICATING SAME

RELATED APPLICATIONS

This application is a division of commonly assigned application Ser. No. 09/041,228, now U.S. Pat. No. 5,973,590, entitled ULTRA THIN SURFACE MOUNT WAFER SENSOR STRUCTURES AND METHODS FOR FABRICATION, filed Mar. 12, 1998.

Kulite Semiconductor Inc., the assignee herein is record owner of U.S. patent application Ser. No. 08/897,470 entitled COVERED SEALED PRESSURE TRANSDUCERS AND METHOD FOR MAKING SAME, filed on Jul. 21, 1997 by Kurtz et al., and U.S. Pat. No. 5,955,771 SENSORS FOR USE IN HIGH VIBRATIONAL APPLICATIONS AND METHODS FOR FABRICATING SAME, filed on Nov. 12, 1997 by Kurtz. et al.

FIELD OF THE INVENTION

The present invention relates to semiconductor transducers and more particularly, to a method of fabricating and packaging a high temperature pressure sensor having dual glass wafers bonded thereto capable of handling high vibrational requirements.

BACKGROUND OF THE INVENTION

Semiconductor pressure transducers are frequently used in applications which require operation in harsh environments that are corrosive and/or involve high temperatures. Accordingly, the stress sensing network of transducers used in such applications, must be protected from these harsh environmental conditions in some way in order for the transducer to remain operational over extended periods of time. In the past, surface over-coatings such as silicon nitride, silicon dioxide and the like, have been provided over the stress sensing network to protect it from harsh operating environments. However, such coatings provide only partial protection as the metalized contact areas of the sensing network remain exposed, which presents problems in applications which involve corrosive environments.

One method which enables the transducer to remain operational in corrosive and high temperature environments involves exposing the backside of the transducer to ambient pressure while hermetically sealing the stress sensing network located on the front side thereof, in the active portion of the diaphragm surface. Such a method is described in co-pending U.S. patent application Ser. No. 08/458,405 filed on Jun. 2, 1995 entitled: HERMETICALLY SEALED TRANSDUCER AND METHODS FOR PRODUCING THE SAME, by A. D. Kurtz and assigned to Kulite Semiconductors Products, the assignee herein. The co-pending application describes a hermetic seal which utilizes a PYROCERAM glass frit or similar means, to bond a cover member to the front side of the transducer to hermetically seal the sensing network. The glass is used in the above-described application to bond the cover member to the inactive portion of the diaphragm because the fabrication processes used in forming the sensing network of the transducer will result in raised surface features when the transducer has a silicon-on-oxide (silicon-on-silicon) structure. The raised surface features such as where the sensing network extends into the contact areas, are not planar with the underlying substrate since they are formed on top of the oxide. This makes it difficult to form a hermetic seal by electrostatically or fusion bonding a cover member to the inactive portion of the diaphragm. For instance, in a silicon-on-oxide transducer structure, the entire silicon network and particularly, the regions on the inactive portion of the diaphragm leading to the metalized contact areas (lead-outs) are elevated from the oxide by several microns. Moreover, a finite space is provided between these raised lead-outs on the order of mils to prevent them from electrically shorting together. The step height of the lead-outs and the finite spaces therebetween create gaps between the cover member and the inactive portion of the diaphragm. These gaps make it virtually impossible to form a hermetic seal between the cover and the inactive portion of the diaphragm by electrostatic or fusion bonding and thus, a glass frit can be used to fill the gaps to create a hermetic cover.

Although the glass frit enables the cover member to be bonded to the inactive portion of the diaphragm to hermetically seal the stress sensing network, there are problems associated with this method. For example, the glass frit has a tendency to flow onto the diaphragm during the high temperature sealing process which causes the performance of the sensors to degrade. There are also thermal mismatching issues and other process compatibility issues which require consideration when using a glass frit. All of this makes the glass frit a difficult material to use for fabricating hermetically sealed covers.

Another problem associated with such a sensor or transducer structure is that the ball bonded lead wires are exposed to the operating environment. Consequently, particles which may be present in the pressure transmitting environment can come into contact with the lead wires and possibly damage them.

During the last few years considerable time and research has been devoted to the development of dielectrically isolated silicon on silicon piezoresistive sensors. In prior art devices the resulting structure consists of a highly doped p+ sensor network fusion bonded to an oxide layer which has been grown on an underlying support wafer. The support wafer in turn forms the flexing portion of the sensor. For instance, a dielectrically isolated Wheatstone bridge sensor consists of four resistor elements situated in a strain sensitive area of the sensor as well as at least four lead-out portions which are directed to contact areas on the non-flexing portion of the structure. It is of course obvious that each of the lead-out structures must be isolated from each other and there must be a space between them. When the sensor is affixed to an additional support structure, on the side of the sensor away from the sensor-resistive network, obtaining an hermetic seal between the sensor and the additional support structure is no problem because the non flexing surface of the support wafer is planar.

However when one attempts to fasten a support member on the sensor-network side, several problems emerge. Although it is possible to seal to the emerging fingers from the sensing network, the spaces between the emerging fingers extend into the flexing region and no hermetic seal can result. This is a particular problem when ones does not want to expose the sensing network side of the sensor to a specific pressure medium. For this case the side of the sensor not exposed to the media must be bonded to the support structure. However, this means that the bond must be made to the side containing the sensor network and the contact fingers. Thus the air leakage paths along the fingers must be sealed. One obvious method of obtaining a seal to attach the support structure to the network side of the sensor is to use a thick enough glass frit which will fill in the spaces between the fingers as well as seal the non deflecting portion of the sensor surface to the support. However, this method gives rise to certain problems. The frit generally has a different and higher thermal expansion coefficient then the silicon sensor structure and the support. It will, therefore, introduce unwanted thermal stresses in the resulting final structure. In addition, during deflection, mechanical stress is applied to the frit and for large stresses at high temperature it may yield. Moreover, the frit to structures seal is made at high temperature and some of the frit may flow onto the flexing portion of the sensor or into the contact areas thus degrading the device performance.

It is, therefore, an object of the present invention to provide an improved method for hermetically sealing a semiconductor pressure transducer which substantially eliminates the use of a glass frit to bond a cover member to the active side of the transducer.

A further object of the present invention is to provide a structure which includes electrical lead outs within the structure that can be fabricated on the wafer level thus insuring a very small rugged sensor.

SUMMARY

The object of the present invention is to provide a hermetically-sealed sensor which has been formed by fusion bonding a P+ sensor network, P+ fingers which also contain contact areas and a P+ rim to an oxide coated diaphragm wafer and then electrostatically bonding a piece of glass of about 0.005 to 0.010 inch thickness having apertures smaller than the fingers which line up with the contact regions on the sensor. The diaphragm wafer is formed to provide a series of flexible diaphragm structures underneath the sensor network and the glass wafer has a series of depressions on the side that is sealed to the P+ fingers and rim such that the sensor network will not seal to the glass and of sufficient depth to allow the diaphragm to deflect. A second glass wafer of thickness about 0.020 inches and having a series of apertures which match the apertures of the first wafer, but may be somewhat larger, is disposed on a top surface of the first wafer. The second glass wafer can also have a segmented sputtered layer of silicon on the surface that is to be adjacent to the first glass wafer or it may have a thin layer of pyroceram on that same surface. If one uses the glass wafer with the sputtered silicon, the second wafer is electrostatically bonded to the first glass wafer and the apertures are filled with a gold frit to a depth of the thickness of the first glass wafer. Pins having an enlarged flattened head, long enough to reach the gold frit head with the point extending towards the first wafer are inserted in the second wafer and the entire structure is fired to solidify the frit.

In the second case, the electrostatic bonding is eliminated at the seal between the two glass wafers is made at the same time the frit is fired.

The reverse side of the second glass wafer may also have etched into it a series of depressions on the unsealed side to help seal the pins and another series of depressions which can contain sputtered metal films for resistors and interconnects. It could also have a sufficient space to include an area on which to mount an IC chip.

When all of the contacts to the fingers are made, the wafer is cut into a group of individual dice which can then be mounted on any surface so forming electric contact to that surface.

BRIEF DESCRIPTION OF THE DRAWINGS

For a complete understanding of the present invention, reference should be made to the following drawings wherein.

DETAILED DESCRIPTION OF THE INVENTION

Figure 1:
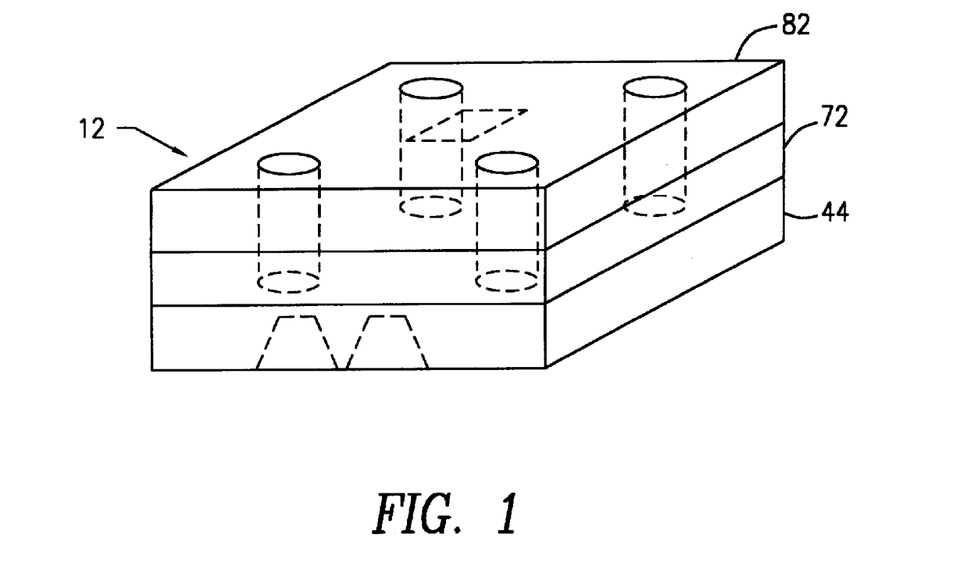
FIG. 1 is a perspective view of a hermetically sealed sensor chip used in the transducer of the present invention.

In FIG. 1 there is shown a perspective view of the sensor transducer chip 12 used in the present invention. The chip 12 comprises an individual semiconductor pressure sensor 44 which is hermetically sealed by a first glass wafer 72 and a second glass wafer 82 disposed on top of the first glass wafer.

Figure 2:
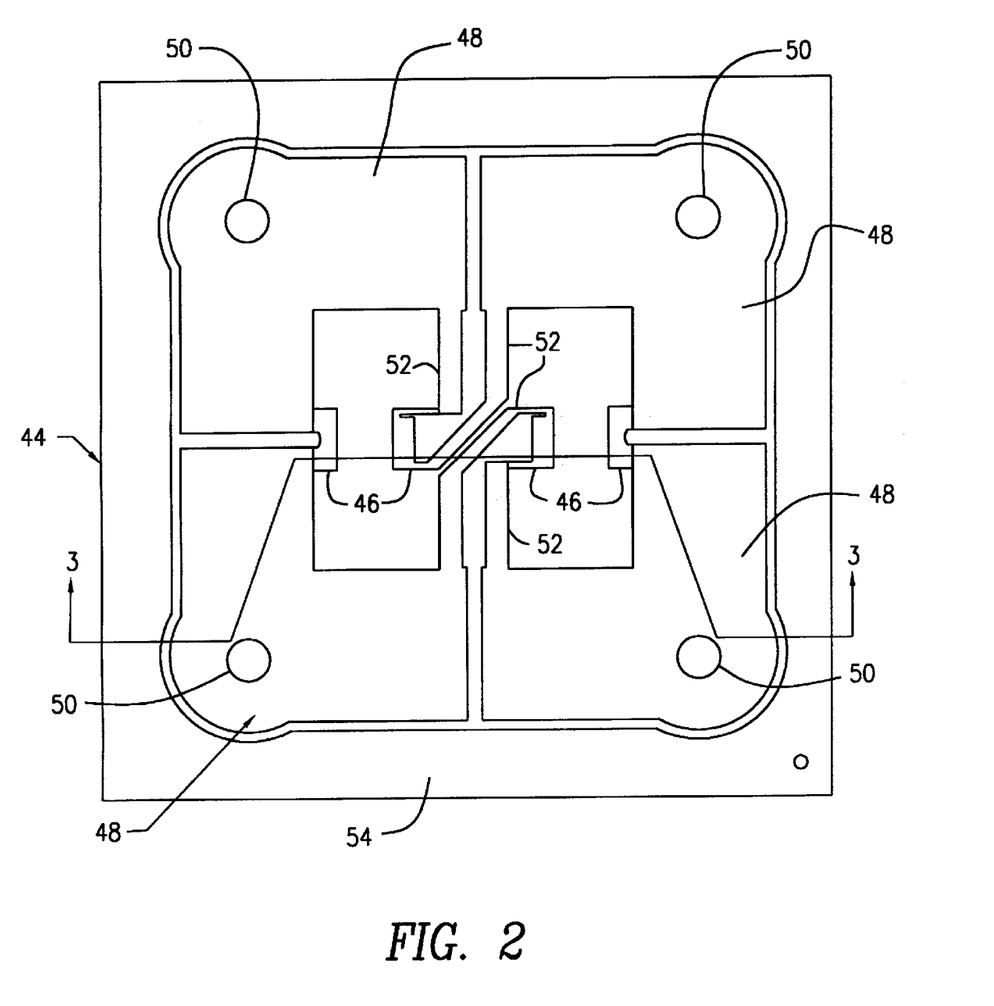
FIG. 2 is a top plan view of the semiconductor transducer employed in the sensor chip.

A plan view of the semiconductor sensor 44 of FIG. 1 is depicted without the first glass wafer member 72 in FIG. 2. The pressure sensor 44 is approximately 100 mils by 100 mils and is fabricated from two or more semiconductor wafers of silicon, or any other suitable semiconductor wafer material. The transducer 44 is fabricated using conventional wafer processing techniques which enable a number of dielectrically isolated piezoresistive sensor elements such as 46, composed of highly doped (P+) silicon to be formed on semiconductor material using dielectric films of $SiO_2$ or the like. It is understood that a number of such sensors can be made at the same time on a large substrate. Each sensor element 46 is essentially a variable resistor in one of four legs of a Wheatstone bridge circuit with each of the respective resistances varying in proportion to an applied force or pressure to the transducer 44.

The circuit nodes of the Wheatstone bridge consist of four oversized P+ diffused silicon electrical contact areas or fingers 48, which are mainly located in non-active areas of the transducer 44. The term "finger" is used to indicate that the areas 48 project from the sensor 44 to the metal contacts 50. The metal contacts 50 within the contact area are circular in shape and are each approximately 10 mils in diameter. Each contact 48 includes a centrally located area of high temperature platinum-titanium metallization 50.

Figure 3:
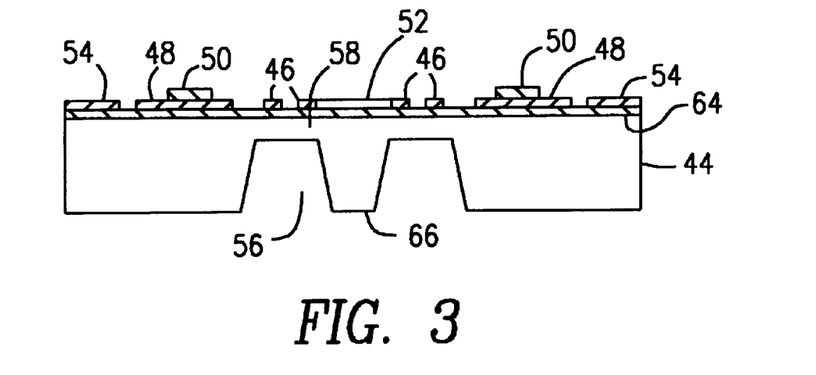
FIG. 3 is a cross-sectional side view through line 3—3 of the sensor of FIG. 2.

Referring to FIG. 3, which shows a cross-sectional view through line 3—3 of FIG. 2, a closed-ended aperture 56 is formed in the bottom of the transducer 44. The area above the aperture is generally referred to as the "active area" of the transducer 44, this area defining an N-type silicon diaphragm 58 to which the sensor elements 46 are attached and located. The "active area" deflects upon the application of a force thereto. The areas of the transducer 44 that are external to the active area are conventionally termed the "non-active" areas. The dielectrically isolated sensors elements 46, the electrical contacts 48, the interconnections 52, and the raised rim 54 are readily fabricated using processes described in U.S. Pat. No. 5,286,671 to Kurtz et al, the disclosure of which is incorporated herein by reference.

The process taught in U.S. Pat. No. 5,286,671 starts with an N-type sacrificial wafer 60 into which the high conductivity P+ areas which form the sensor elements 46, the contacts 48, and the interconnections 52 are diffused using oxide and/or nitride masking and photolithography as shown. In the present invention, the P+ raised rim 54 is also fabricated along with the other P+ structures.

Figure 4A:
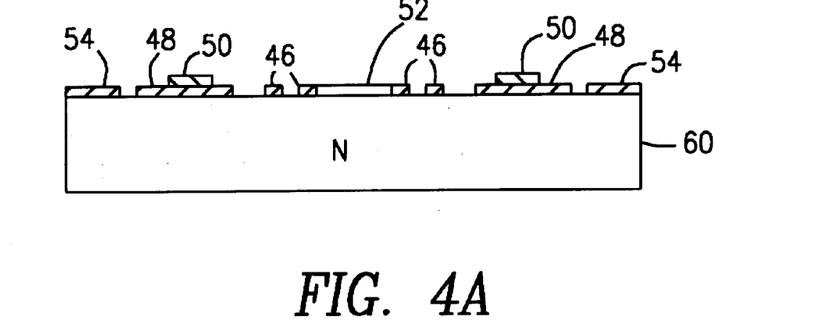
FIGS. 4A and 4B are cross-sectional side views depicting the fabrication of the semiconductor sensor of FIGS. 2 and 3.
Figure 4B:
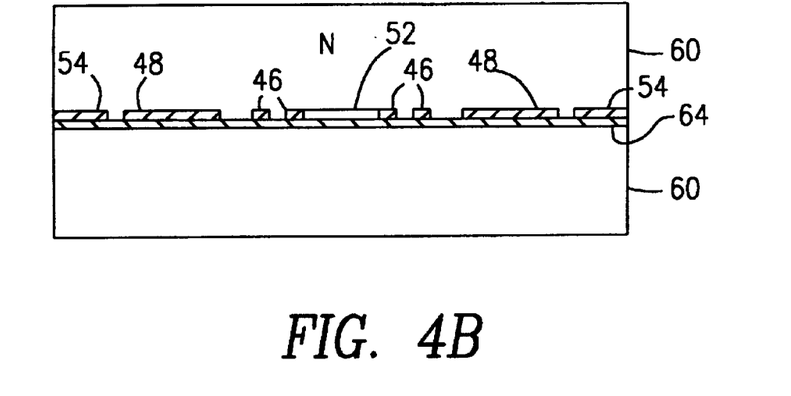

As shown in FIG. 4A, subsequent to the diffusion, the surface of the sacrificial wafer 60 is treated with a conductivity-selective etch which does not attack the P+ areas 46, 58, 52, 54 leaving them raised from the surface. In FIG. 4B, the sacrificial wafer 60 is then fusion-bonded to an N-type "diaphragm" wafer 62 which has been previously treated to obtain a dielectric layer 64 of preferably 5000 Å to 15,000 Å of silicon dioxide thereon. Although the dielectric layer 64 is preferably silicon dioxide, other dielectric layers can be used as well. The dielectric layer 64 operates to dielectrically "isolate" the sensor elements 46 from the diaphragm wafer 62. After fusion bonding, the N-type material of the sacrificial wafer 60 is removed using a conductivity-selective etch, leaving only the P+ sensors 46, the interconnections 52, the contact areas 48 and the raised rim 54 bonded to the diaphragm wafer 62 to produce the transducer 44 of FIG. 3. The contact areas are then metalized using conventional techniques and at the same time, the aperture 56 is fabricated in the bottom of the diaphragm wafer 62 to form the diaphragm 58 of the transducer 44. The thickness of the diaphragm determines its stiffness. Note that the position of the sensor elements 46 with respect to the diaphragm 58 is determined by the form factor of the diaphragm 58, i.e., flat plate or the shown bossed structure identified by numeral 66. The diaphragm wafer 62 itself may be shaped using known etching techniques as is taught in U.S. Pat. No. 4,236,137 to Kurtz et al., which is incorporated herein by reference.

Figure 4C:
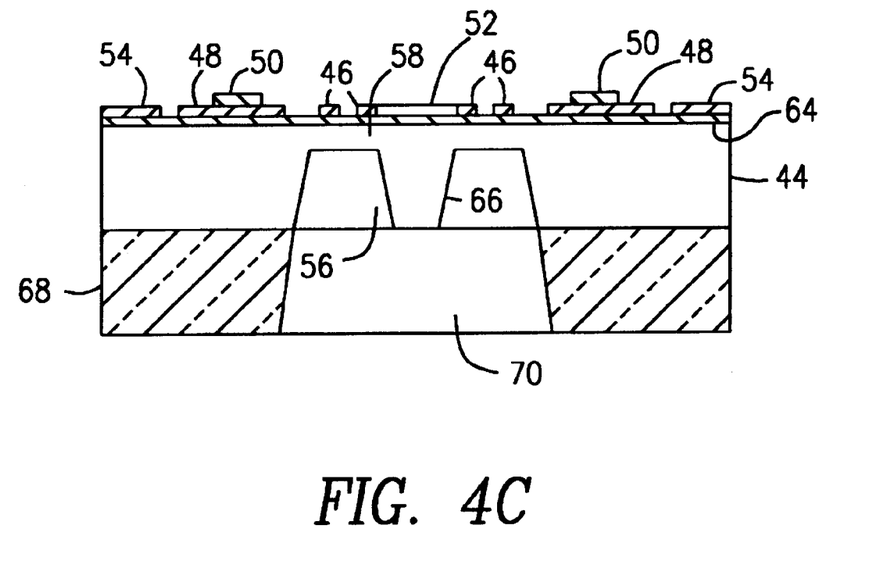
FIG. 4C is a cross-sectional side view through the semiconductor sensor of FIG. 4B showing the addition of an optional reinforcement structure.

At this point, a glass substrate 68 can be optionally provided if desired by electrostatically bonding it to the non-sensing side of the transducer 44 for additional clamping, as is shown in FIG. 4C. The glass substrate 68 may be made of PYREX or silicon containing a PYREX layer. The glass substrate 68 or silicon substrate includes an aperture 70 that extends therethrough. The aperture 70 allows a force or pressure to be applied to the underside of the diaphragm 58 to deflect and induce a stress which causes the resistances of the piezoresistive sensor elements 46, to change.

Figure 5A:
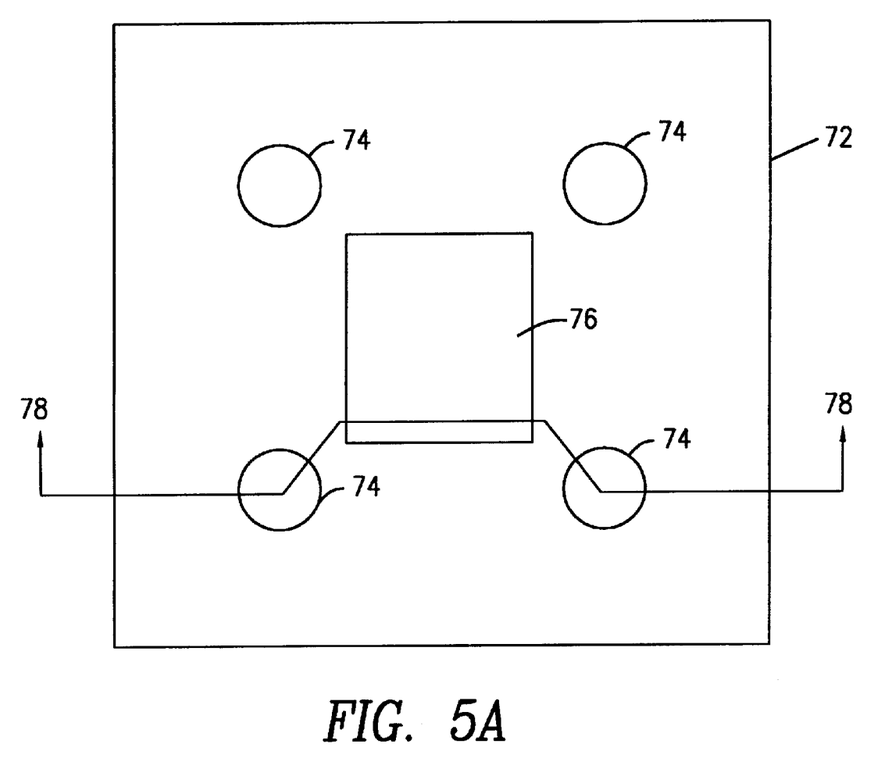
FIG. 5A is a bottom plan view of the cover of the sensor chip of FIG. 1.

Referring now to FIG. 5A, there is shown a bottom view of first member 72 which is to be bonded to the transducer 44 of either FIGS. 3 or 4C. First member 72 is fabricated from a glass such as PYREX. It is understood that geometries other than square may be utilized for first member 72 with the geometry used being generally congruent to that of the transducer 44. In any case, member 72 has four apertures 74 disposed in areas which will overlie the metalized portions 50 (FIG. 2) of the contacts 48 of the transducer 44.

Figure 5B:
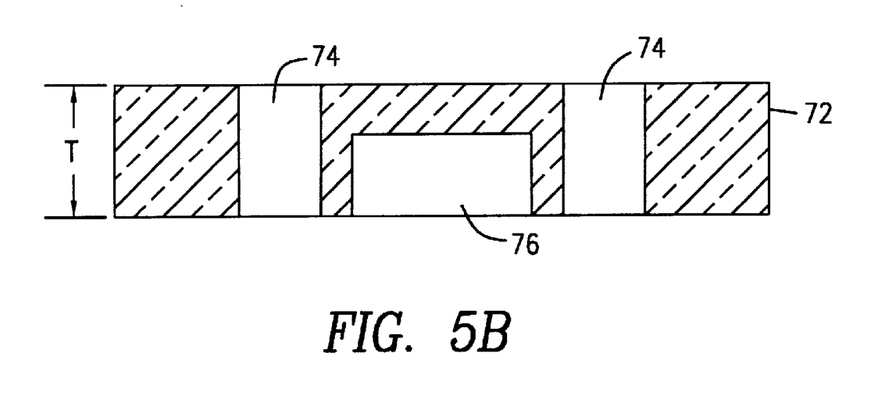
FIG. 5B is a cross-sectional side view through line 7B—7B of the cover of FIG. 5A.
Figure 8:
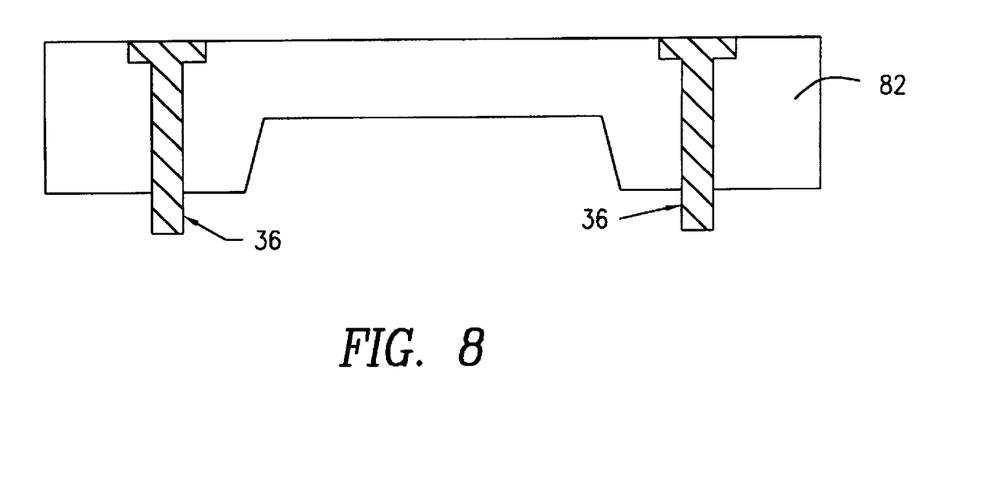
FIG. 8 is a cross-sectional view of the second glass wafer member having pins extruding through the wafer.

Each aperture 74 is fabricated to be approximately 10 mils in diameter so that a corresponding header pin 36 (FIG. 8C) can be received therein as will be explained. Each of the apertures 74 are correspondingly smaller than the fingers which line up with the contact regions of the transducer sensor. The member 72 also has a centrally located cavity 76 which will overlie the active area of the transducer 44 and enable the diaphragm 58 to flex when a force or pressure is applied thereto. As shown in FIG. 5B, which is a cross-sectional view through line 7B—7B of FIG. 5A, member 72 has a thickness T which is on the order of approximately 5 mils thick.

Once fabricated, member 72 is ready to be electrostatically bonded without sealing glasses and the like to the transducer 44 of FIG. 3 or 4C. Glass member 72 further includes a series of depressions located on the bottom surface or side that is sealed to the P+ fingers and rim such that the sensor network will not seal to the glass and having sufficient depth to allow the diaphragm to deflect. The bottom surface of the member 72 thus directly engages the P+ diffusion raised rim 54 and enlarged contacts 48 in the non-active area of the transducer 44. No sealants of any type are needed between the glass member 72 and the transducer 44 because the oversized contacts 48 and the raised rim 54 are provided on the transducer 44. First glass member 72 is then electrostatically bonded to the transducer by placing the two wafers in a heated vacuum chamber (not shown) and heating them under a vacuum for about 45 minutes at approximately 400° C. At the same time, a high voltage on the order of 400 to 1500 volts D.C. is applied between the glass member 72 and the transducer 44. This process causes the bottom surface of the glass member 72 to become slightly conductive such that an intimate molecular bond between the member 72 and the P+ diffused raised rim 54 and fingers 48 of the transducer 44 results. The seal to the rim and the fingers provide the hermetic seal for the sensor.

Figure 6:
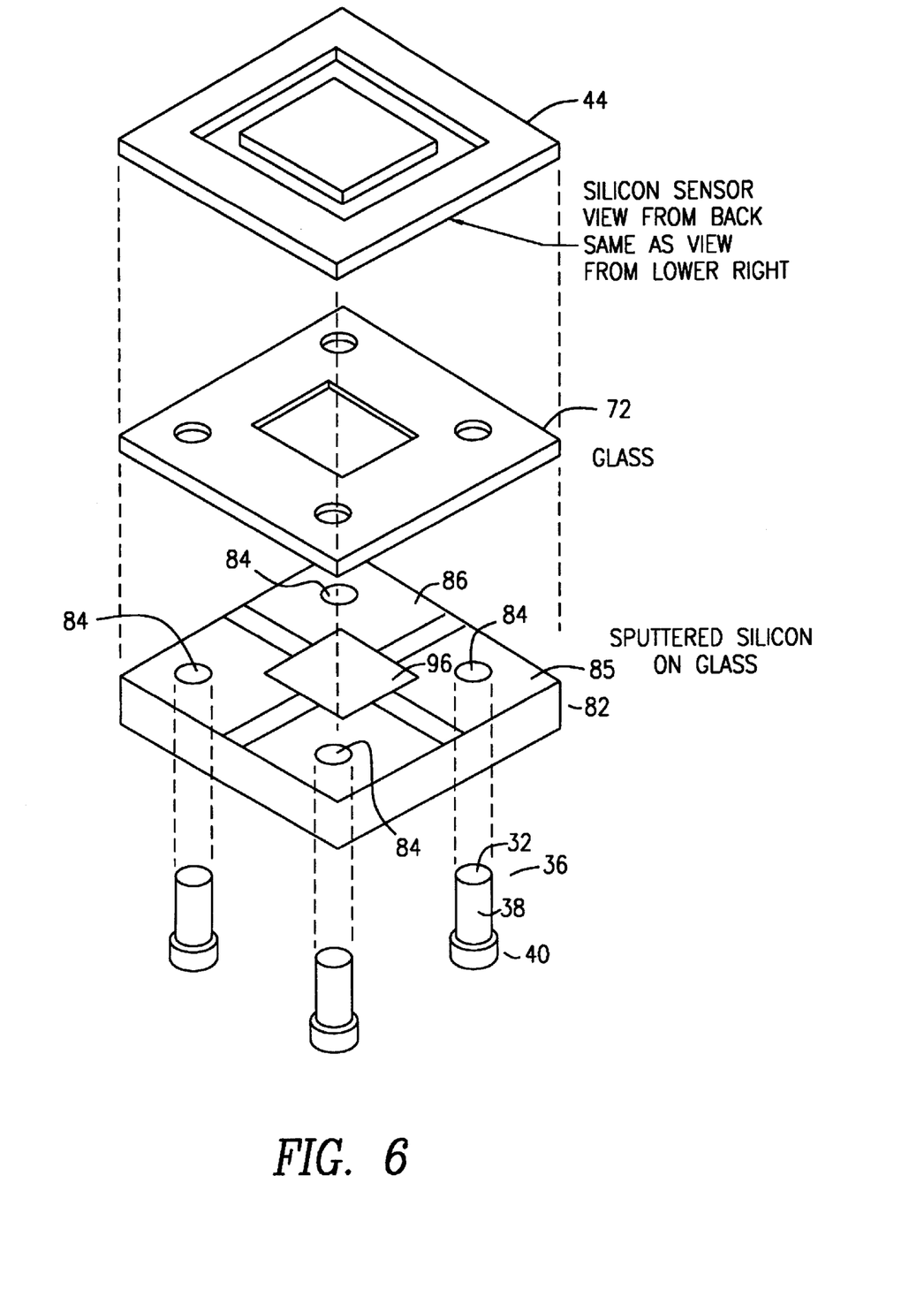
FIG. 6 is a back perspective view of the sensor device according to the present invention.
Figure 7:
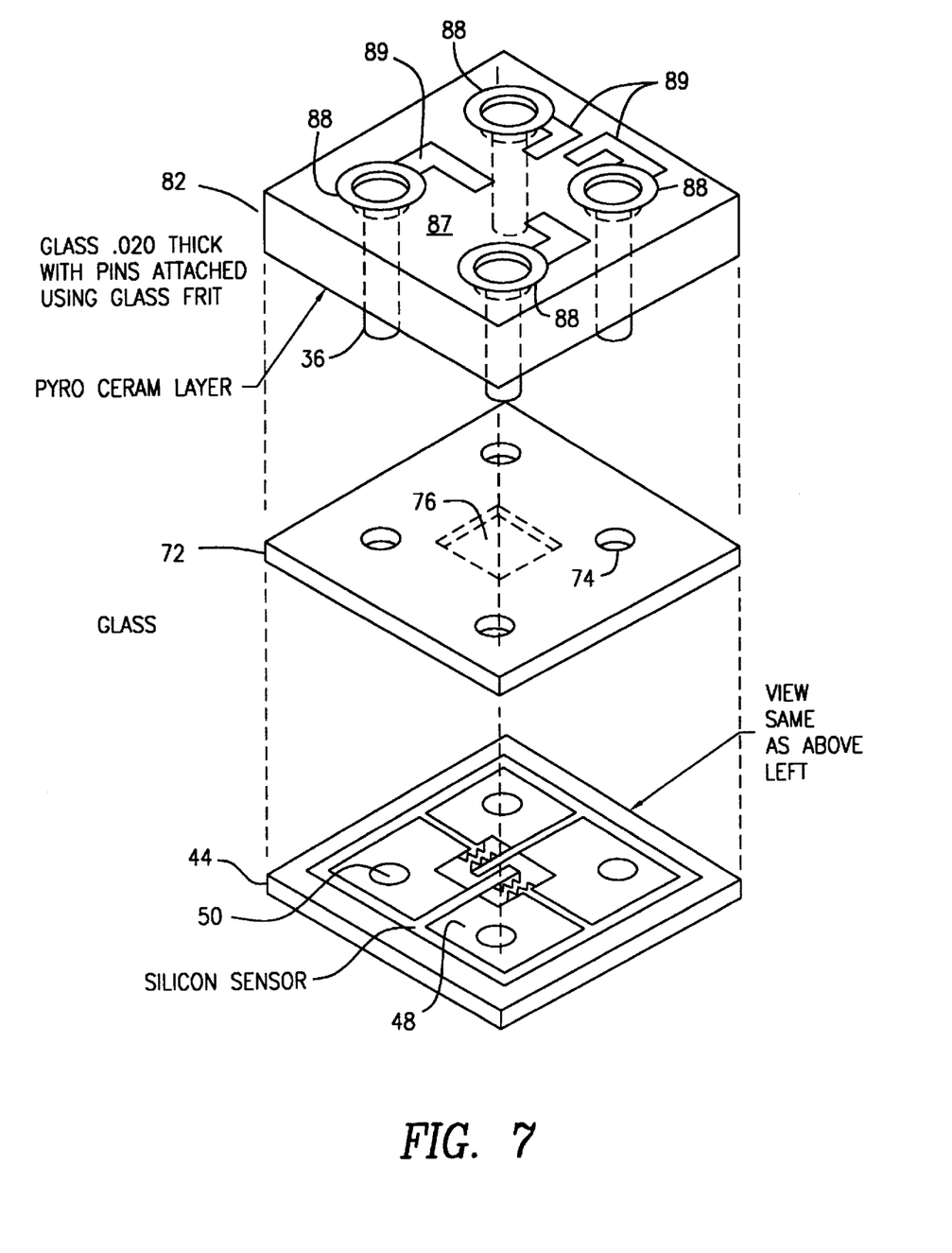
FIG. 7 is a front perspective view of the sensor device showing the semiconductor device sensor, first glass wafer and second glass wafer.

Upon completion of this electrostatic bonding operation, a second glass wafer 82 having a thickness T, preferably of about 20 mils and a series of apertures 84 and 96 which geometrically match the apertures of the first glass wafer 72 are disposed on the top surface of the first glass member. The second glass wafer 82, as shown in FIG. 6, may also have a segmented sputtered layer of silicon 86 disposed on the surface 85 that is to be adjacent to the first glass wafer 72. In an alternative embodiment, a thin layer of PYROCERAM glass may be disposed on that same surface. When the second glass wafer 82 having sputtered silicon 86 disposed on surface 85 is used, the second glass wafer 82 is then electrostatically bonded to the first glass wafer 72. The apertures 74 are then filled with a frit material, preferably a gold frit, to adapt consistent with the thickness of the first glass wafer 72. As shown in FIGS. 6 and 7, pins 36 having an enlarged flattened head member 40 and a shaft portion 38 and end 32 and having length sufficient to reach the gold frit with the shaft and end portions extending towards the first wafer are inserted into the second wafer. The entire structure 12 is then fired to solidify the frit. In the alternative embodiment, where a thin layer of PYROCERAM is placed on second glass wafer 82, the electrostatic bonding of the first and second glass wafers is eliminated and the seal between the two glass wafers 72 and 82 is made during the step in which the entire structure is fired to solidify the frit. As best seen in FIG. 7, the reverse side 87 of the second glass wafer 82 may also have etched into it a series of depressions 88 (on the unsealed side) in which to receive the pins 36 to aid in sealing the pins to the reverse side of the wafer. The reverse side 87 may also contain another series of depressions 89 which may contain sputtered metal films for resistors and interconnects. Still further, the reverse side may also include sufficient space to comprise an area on which to mount a semiconductor device such as an integrated circuit (IC) chip. Note that when all of the contacts to the fingers are made, the wafer is cut into a group of individual dice which can then be mounted on any surface, so forming electric contact to that surface.

Upon completion of the electrostatic bonding and firing operations, the transducer 44 is now hermetically sealed and the resulting wafer of which an individual sensor is shown as chip 12 is removed from the vacuum chamber. As previously described, the wafer is now cut into individual dice the structure of which is shown in as 12. The seal to the rim insures that there is no passage of gas or any fluid from the outside of the chip into the active area. In addition, the seal to the fingers also insures that there is no passage of gas or other fluids from the contact area into any internal portion of the sensor. Note that in order to obtain proper electrical contact the hermetically sealed sensor chip 12 is prepared by filling the apertures 74 in the 72 with a conductive glass frit 78, preferably a mixture of gold and glass frit. It is preferred that the glass frit is made with PYROCERAM, a glass material manufactured by Corning Glass Co. These glasses are thermosetting and devitrify at temperatures on the order of 450 degrees C. Upon devitrification, the glass develops a crystalline structure which results in a strong seal as the crystallized material's softening point is higher than conventional glass. PYROCERAM also exhibits excellent mechanical properties at temperatures well in excess of 400 degrees C. The PYROCERAM glass metal frit is prepared by mixing the finely powdered PYROCERAM glass and gold with a suitable suspension vehicle, such as a mixture of nitrocellane in anylacerate, to a desired consistency to form a paste-like mixture of gold-glass frit. The paste-like mixture of gold-glass frit 78 is then injected using any suitable method into each aperture 74 of the member 72.

As shown in FIGS. 6 and 7, when constructing the sensor device, the wafer containing the hermetically sealed sensor chip is lowered onto the mounting surface 85 of the second glass wafer 82 with the first glass wafer 72 of the chip 12 facing the mounting surface 85 such that the end portions 32 of the header pins 36 pass through apertures 84 and enter the conductive-glass-frit 78 filled apertures 74 in the member 72. Note that the drawings illustrate the geometry of a single sensor; however, its is understood that each wafer contains a multiplicity of individual elements. The structure is then placed into a heated chamber (not shown) and a uniform, moderate pressure is applied to the chip 12 using a clamping fixture or the like to ensure that the glass frit 78 located between the mounting surface of the second glass wafer 82 and the outer surface of the cover 72 is evenly distributed therebetween. The structure is then fired or heated for about 45 minutes at approximately 500 degrees C. to simultaneously both cure the glass frit 78 and conductive-glass-frit 78, thereby achieving a hermetic mounting of the chip 12 on the second glass wafer. Note that the head portions 40 of the header pins 36 may be attached or further secured to the top (i.e. unsealed) surface 85 of the second glass wafer by means of a gold epoxy or other adhesive substance to securely fasten the pins within the structure. It should be understood, however, that due to manufacturing tolerances and the like, that the end portions of the header pins 36 can also directly contact the metalized portions 50 of the contacts 48 without any harmful effects.

Note that as shown in FIG. 7, (as well as FIG. 8) a metallic header pin 36 is inserted into each of the four apertures 84 of second glass wafer 82. In the preferred embodiment, the a top surface of the head portions 40 of each of the header pins 36 is substantially coplanar with the top surface 85 of the second glass wafer. When installed in the apertures 84 of the second glass wafer, the shaft and end portions of the header pins extend through the second glass surface and protrude approximately 2–5 mils therefrom to engage each of the corresponding apertures 74 within the first glass wafer member 72. Note that the header pins 36 may be hermetically bonded and sealed within their apertures, preferably by any suitable glass to metal seal. The pins are spaced such that their spacing corresponds to the spacing of the apertures in the chips.

Figure 9:
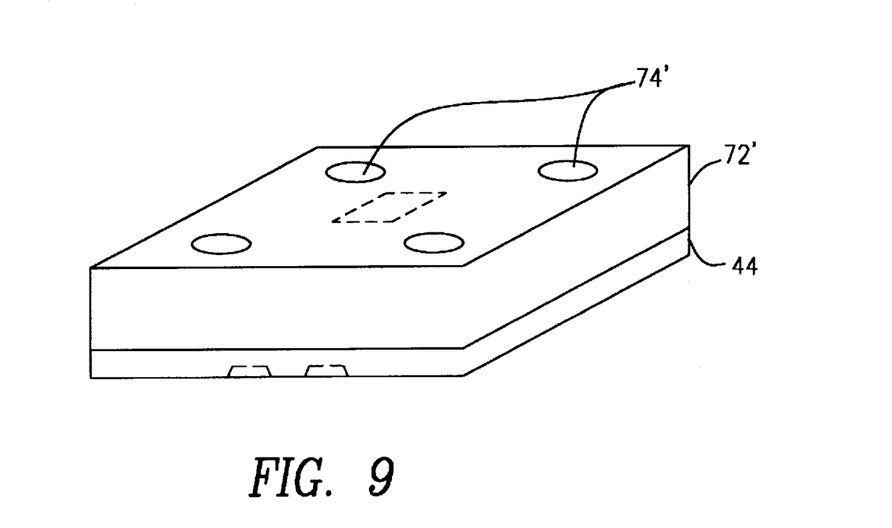
FIG. 9 is a perspective section view of a hermetically sealed sensor chip in another embodiment with a single glass wafer used in the transducer of the present invention.
Figure 10:
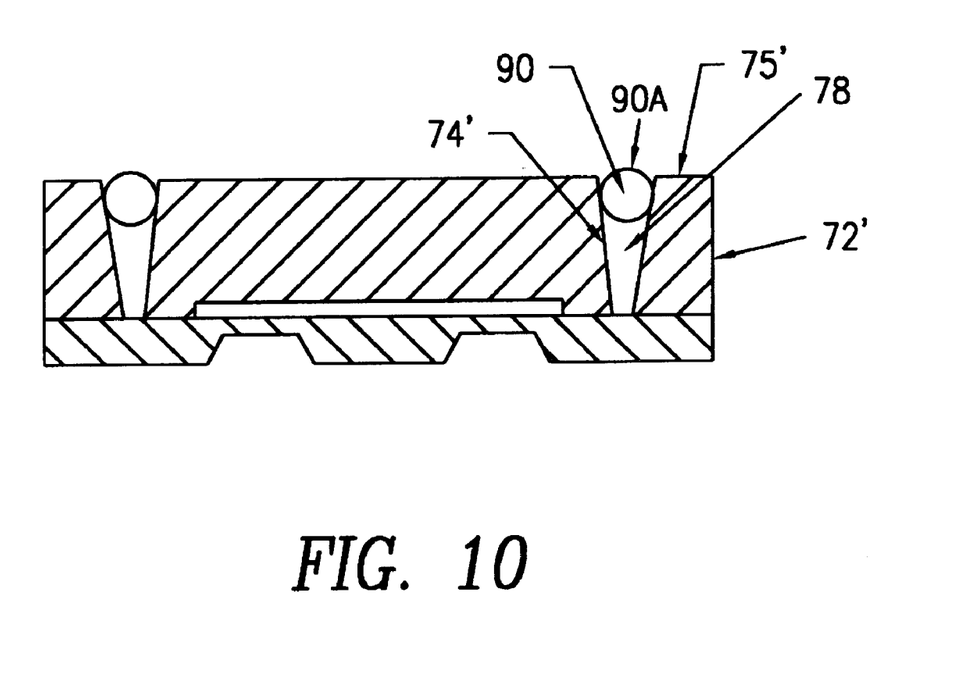
FIG. 10 is a cross-sectional view of the sensor with a single glass layer used in a second embodiment of the invention.

In an alternative embodiment shown in FIGS. 9 and 10, a single thicker glass wafer 72' can be used to contact the active surface of the silicon wafer. For this embodiment the glass wafer is preferably of a thickness of about 0.030 inches and the apertures 74' on the side of the glass that contact the silicon 44 must be just slightly larger than the metalized regions but smaller than the width of the fingers to insure hermetic seals. However, as shown in FIG. 10, the apertures 74' should be tapered in dimension to accommodate and secure a small metallic sphere 90. In this case, the glass wafer is electrostatically bonded to the silicon wafer as previously. Then the apertures 74' are filled almost to top surface 75' with an unfired metal glass frit 78 and small spheres or balls of metal 90 are inserted into the unfired frit but leaving a portion 90A of the ball 90 protruding past the top edge 75' of the glass 72'. The structure is then fired to make an electrical contact between the spheres and the metalized regions on the fingers. After firing, the structure may be cut into individual sensors. Although such a process may be somewhat simpler, the requirement to form tapered apertures in a thicker piece of glass is somewhat more difficult so that depending on the specific application, either one of the methods may be chosen.

Although the hermetic bonding process of the present invention has been described in conjunction with a "dielectrically isolated" type of transducer, it should be understood that "non-isolated" types of transducer structures and the like, can likewise be packaged according to the methods and techniques of the present invention.

In any case, all variations or modifications to the invention described hereinabove are intended to be included within the scope of the invention as defined by the appended claims.

What is claimed is:

1. A method in which a semiconductor sensor device is made comprising:

coating a semiconductor diaphragm with an oxide layer;

fusion bonding P+ sensor elements to said oxide layer at a relatively central area of said diaphragm;

fusion bonding P+ finger elements to said oxide layer extending from said sensors to an outer contact location outside of the active portion of said diaphragm for each finger;

fusion bonding an external rim of P+ material to said oxide layer and surrounding said sensors and said fingers;

electrostatically bonding a first glass wafer to said fingers and said rim to hermetically seal said sensors and said fingers of said diaphragm member at a top surface, said glass member made with a depression above said sensors and having a plurality of apertures, each aperture associated with a separate finger wherein the apertures are made smaller than the width of such fingers and being aligned with said fingers wherein each aperture associated with a separate finger at said contact location can be accessed via said associated aperture in said glass member;

sealingly coupling a second glass wafer member to a top surface of said first glass wafer and having a plurality of apertures aligned with said plurality of apertures of said first glass wafer member and containing a group of hermetically sealed pins for coupling to said contact locations.

2. The method according the claim 1, further comprising the step of providing a layer of sputtered silicon disposed directly adjacent and engaging each of said first and second glass wafer members wherein said first and second wafers are electrostatically bonded to one another via said sputtered silicon to provide a hermetic seal therebetween.

3. The method according to claim 1, further including the step of depositing a conductive glass frit mixture in said aperture of said first glass wafer.

4. The method according to claim 1, wherein said semiconductor sensor chip includes providing a semiconductor sensor chip having semiconductor device which comprises a semiconductor pressure transducer.

5. The method according to claim 4, wherein said semiconductor pressure transducer includes a diaphragm made from semiconductor material which flexes in response to an applied force, said diaphragm having at least one sensor element disposed on said surface for gaging the flexing of said diaphragm, said at least one contact coupled to said at least one sensor element for enabling an electrical connection to be made to said at least one sensor element.

6. The method according to claim 5, wherein a dielectric layer is disposed between said diaphragm and said at least one sensor element for electrically isolating said at least one sensor element from said diaphragm.

7. The method according to claim 5, wherein said at least one sensor element comprises at least one piezoresistive sensor element.

8. The method according to claim 3, wherein said conductive glass frit includes gold particles.

9. The method according to claim 1, further comprising the step of depositing a thin layer of a glass frit disposed directly adjacent and engaging each of said first and second glass wafer members and wherein the pins of said second glass member inserted into the unfired glass metal frit and firing the structure so as to seal the sensor to the first and second glass wafer members and affix the pins of the structure to the sensor structure.

10. The method according to claim 1, wherein said second glass wafer further includes a first plurality of depressions on a top surface for providing layers for resistors and interconnect structures and a second plurality of depressions on said top surface for sealing the header portions of said pins for coupling to said semiconductor chip.

11. A method for making a semiconductor sensor device comprising:

coating a semiconductor diaphragm with an oxide layer;

fusion bonding P+ sensor elements to said oxide layer at a relatively central area of said diaphragm;

fusion bonding P+ finger elements to said oxide layer extending from said sensors to an outer contact location outside of the active portion of said diaphragm for each finger;

fusion bonding an external rim of P+ material to said oxide layer and surrounding said sensors and said fingers;

electrostatically bonding a first glass wafer to said fingers and said rim to hermetically seal said sensors and said fingers of said diaphragm member at a top surface, said glass wafer having a plurality of apertures, each aperture associated with a separate finger, wherein the apertures are tapered and made smaller than the width of such fingers; and sealingly coupling a second glass wafer member to a top surface of said first glass wafer and having a plurality of apertures aligned with said plurality of apertures of said first glass wafer member and containing a group of hermetically sealed pins for coupling to said contact locations, wherein such apertures are filled almost to a top surface with an unfired metal glass frit and wherein metal spheres are inserted into said frit such that a portion of said sphere protrudes past the top surface of said wafer and firing said semiconductor device to make an electrical contact between said spheres and said metalized regions on said fingers, wherein said metal spheres are hermetically isolated from said diaphragm structure.

12. The method according to claim 11, further including the step of depositing a conductive glass frit mixture in said apertures of said single glass wafer.

* * * * *